United States Patent [19]

Tanaka

[11] Patent Number: 4,899,605

[45] Date of Patent: Feb. 13, 1990

[54] STARTER WITH PLANET GEAR SPEED REDUCER

[75] Inventor: Toshinori Tanaka, Hyogo, Japan

[73] Assignee: Mitsubishi Denki Kabushiki Kaisha, Tokyo, Japan

[21] Appl. No.: 331,328

[22] Filed: Mar. 31, 1989

[30] Foreign Application Priority Data

Apr. 19, 1988 [JP] Japan ............................ 63-53415[U]

[51] Int. Cl.[4] ........................ F02N 15/06; F16H 1/28; F16J 15/06

[52] U.S. Cl. ........................................ 74/7 E; 74/801; 277/166; 475/149; 475/331

[58] Field of Search ..................... 74/7 E, 7 R, 6, 785, 74/801; 277/166, 102, 101, 105

[56] References Cited

U.S. PATENT DOCUMENTS

| | | | |
|---|---|---|---|
| 795,444 | 7/1905 | Kales | 277/105 |
| 2,623,764 | 12/1952 | Naylor | 277/166 |
| 2,647,769 | 8/1953 | Smith | 277/166 |
| 3,045,830 | 7/1962 | Fulton | 277/102 |
| 3,528,668 | 9/1970 | Barton | 277/102 |
| 4,494,414 | 1/1985 | Hamano | 74/7 E |
| 4,525,632 | 6/1985 | Tanaka | 290/38 R |
| 4,590,811 | 5/1986 | Kasubuchi | 74/7 E |
| 4,635,489 | 1/1987 | Imamura et al. | 74/7 E |
| 4,680,979 | 7/1987 | Morishita et al. | 74/7 E |
| 4,717,160 | 1/1988 | Zitting et al. | 277/105 |

*Primary Examiner*—Allan D. Herrmann
*Assistant Examiner*—Janice E. Chartoff
*Attorney, Agent, or Firm*—Sughrue, Mion, Zinn, Macpeak & Seas

[57] ABSTRACT

In a starter having a planet gear speed reducer in which the front frame is secured to the end face of the motor with penetrating bolts, a cylindrical packing with ears is mounted on an internal gear with the penetrating bolts inserted into the ears so that, when the penetrating bolts are tightened, the ears of the packing are inscribed in the front frame, while sealingly holding the penetrating bolts, and the packing is compressed between the end face of the motor and the flange of the internal gear, thus eliminating the difficulty that water flows down the penetrating bolts into the motor.

1 Claim, 2 Drawing Sheets

FIG. 1
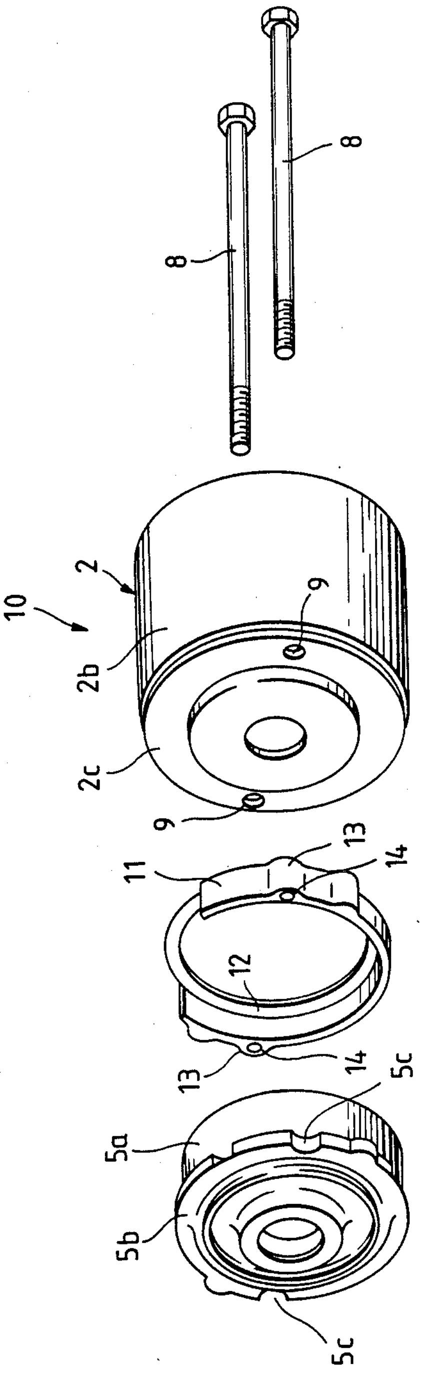
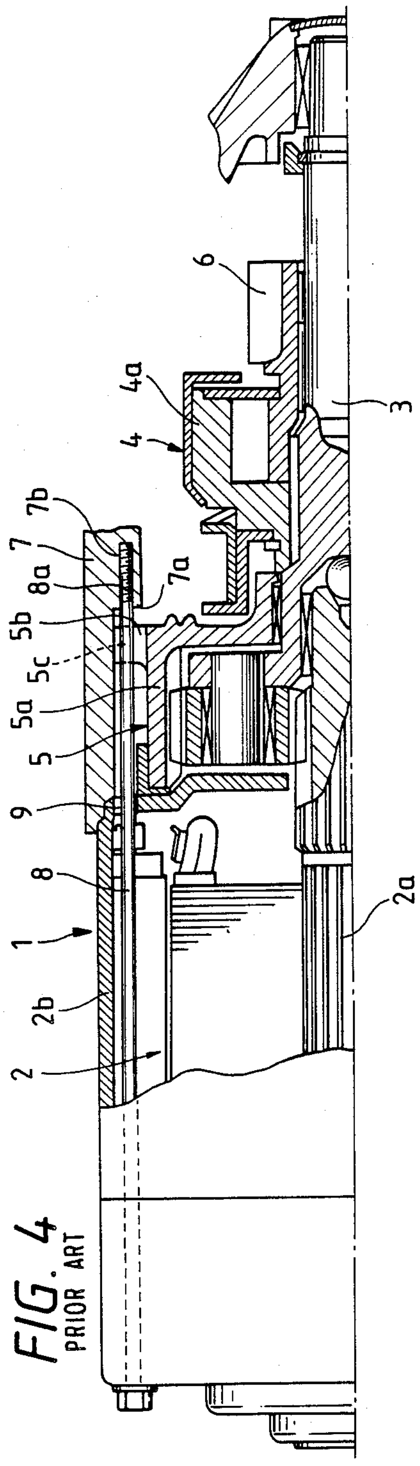
FIG. 4
PRIOR ART

STARTER WITH PLANET GEAR SPEED REDUCER

BACKGROUND OF THE INVENTION

This invention relates to a starter with a planet gear speed reducer, and more particularly to a water-proof structure about penetrating bolts inserted into the peripheral portion of an internal gear forming the planet gear speed reducer.

A conventional starter with a planet gear speed reducer (hereinafter referred to merely as "a starter", when applicable) is as shown in FIG. 4. The conventional starter 1, as shown in FIG. 4, essentially comprises: a DC motor 2; an overrunning clutch 4 slidably mounted on the output rotary shaft 3 of the starter; and a planet gear speed reducer 5 for reducing the torque of the armature rotary shaft 2*a* of the DC motor 2 and transmitting the torque thus reduced through the output rotary shaft 3 to the clutch outer 4*a* of the overrunning clutch 4. The output rotary shaft 3, the planet gear speed reducer 5, and the overrunning clutch 4 are surrounded by the front frame 7 of the starter with the exception of the lower opening (not shown) which is so formed as to allow a pinion 6 integral with the clutch inner 4*b* of the overrunning clutch to engage with the engine ring gear when the overrunning clutch 4 is slid forwardly. The front frame 7 is fixedly secured to the periphery of the end face of the DC motor 2 as follows: Penetrating bolts 8*a* are inserted into the DC motor 2 from behind to penetrate the latter with a small clearance formed between the inner wall of the yoke 2*b* and each of the bolts 8*a*, and the threaded end portions 8*a* of the bolts 8 are engaged with the threaded holes cut in the step 7*a* which is formed on the inner wall of the front frame 7.

More specifically, the penetrating bolts 8 are extended through the holes 9 formed in the end face of the DC motor 2 which is integral with the yoke 2*b*, over an internal gear 5*a* forming the planet gear speed reducer 5, and through cuts 5*c* formed in a flange 5*b* which is radially outwardly extended from the front periphery of the internal gear 5*a*, thus reaching the threaded holes 7*b* in the step 7*a* formed on the inner wall of the front frame.

As was described above, the front frame 7 has the opening through which the pinion 6 is partially exposed so as to be engaged with the engine ring gear. Because of the provision of the opening, the conventional starter 1 suffers from the following difficulties: Water may go into the frame 7 through the opening. More specifically, it may flow down the penetrating bolts 8, and run through the cuts 5*c* of the internal gear flange 5*b* and through the holes 9 formed in the end wall of the DC motor 2, into the latter 2; that is, the DC motor may be damaged by the water flowing thereinto through the opening formed in the frame.

SUMMARY OF THE INVENTION

Accordingly, an object of this invention is to eliminate the above-described difficulty accompanying a conventional starter with a planet gear speed reducer.

More specifically, an object of this invention is to provide a starter having a planet gear speed reducer in which no water is allowed to flow down the penetrating bolts of the electric motor into the latter.

The foregoing object and other objects of the invention have been achieved by the provision of a starter having a planet gear speed reducer in which the front frame thereof is fixedly secured to the periphery of the end face of an electric motor with penetrating bolts which penetrate said electric motor, which comprises: a cylindrical packing of elastic material arranged adjacent to the end face of the electric motor and fitted on the outer cylindrical wall of an internal gear, the cylindrical packing having protrusions which are radially outwardly extended from the cylindrical wall of the packing and have holes into which the penetrating bolts are inserted, the end face of the electric motor having an engaging part which, when the front frame is fixedly secured to the end face of the electric motor with the penetrating bolts, is engaged with the front frame so that the protrusions of the cylindrical packing are inscribed in the front frame and the inner cylindrical walls of the holes formed in the protrusions are brought into close contact with the penetrating bolts, and the packing is compressed by the end face of the motor and a flange which is radially outwardly extended from the rear edge of the outer cylindrical wall of the internal gear.

In the starter of the invention, by tightening the penetrating bolts, the engaging part of the end face of the electric motor which is engaged with the rear end portion of the front frame pushes the cylindrical packing axially which is fitted on the outer cylindrical wall of the internal gear; that is, it compresses the cylindrical packing against the flange of the internal gear. As a result, the protrusions of the packing, in which the penetrating bolts inserting holes are formed, are inscribed in the front frame, while the inner cylindrical walls of the penetrating bolt inserting holes are brought into close contact with the penetrating bolts, and the front end faces of the protrusions are pushed against the flange of the internal gear, thus closing the cuts which are formed in the flange to receive the penetrating bolts.

The nature, principle and utility of the invention will become more apparent from the following detailed description when read in conjunction with the accompanying drawings.

BRIEF DESCRIPTION OF THE DRAWINGS

In the accompanying drawings:

FIG. 1 an exploded perspective view showing a part of one example of a starter with a planet gear speed reducer according this invention;

FIG. 4 a side view, with its one half in longitudinal section, of a conventional starter with a planet gear speed reducer.

DETAILED DESCRIPTION OF THE INVENTION

Figure 2:
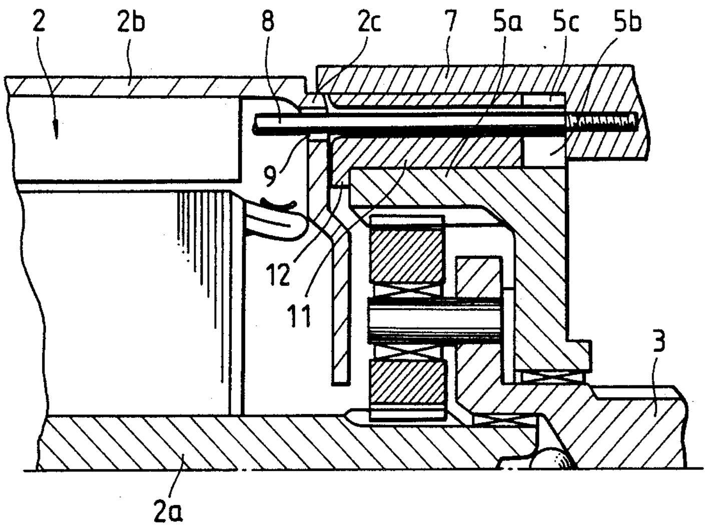
FIG. 2 a sectional view showing a part of the starter in which the penetrating bolts are not tightened yet.

One example of a starter having a planet gear speed reducer according to this invention will be described with reference to FIG. 1, in which those components corresponding functionally to those which have been previously described with reference to FIG. 4 are therefore designated by the same reference numerals or characters.

As shown in FIG. 1, the starter 10 has a cylindrical packing 11 made of an elastic material such as rubber.

The packing 11 is fitted on the outer cylindrical wall of an internal gear 5*a* forming the planet gear speed reducer 5. The packing 11 has an annular rim 12 at the rear end, on the side of a DC motor 2 (on the right side in FIG. 1, and on the left side in FIG. 2). The annular rim 12, as showing in FIG. 2, is abutted against the rear end face of the internal gear 5*a*.

Figure 3:
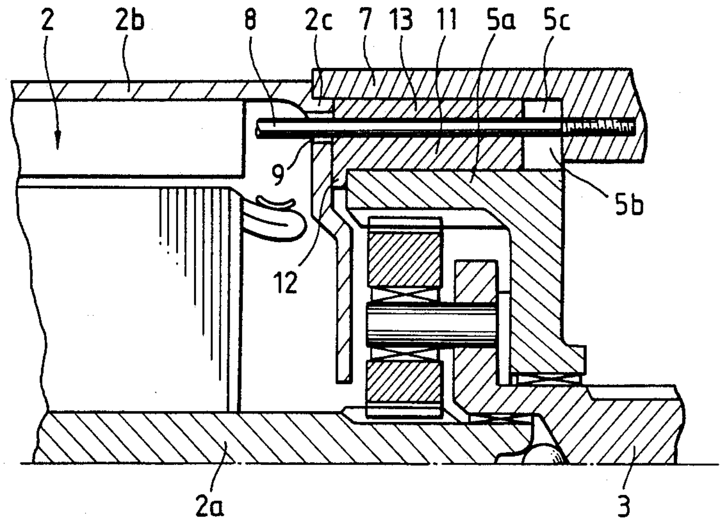
FIG. 3 is a sectional view showing the part of the starter in which the penetrating bolts have been tightened.

In general, a starter of this type employs two penetrating bolts 8. The packing 11 has two protrusions 13 which are radically outwardly extended from two parts of the cylindrical wall thereof at which the two penetrating bolts 8 are laid, respectively. Two holes 14 are formed in the protrusions 13, to receive the penetrating bolts 8, respectively. In FIGS. 1 and 2, reference character 2*c* designates the engaging part which is provided along the periphery of the end face of the DC motor so as to be engaged with the front frame 7. The starter 10 thus constructed is assembled as follows: In the starter 10 shown in FIG. 2, the penetrating bolts 8 are not tightened yet. Under this condition, the penetrating bolts 8 are gradually tightened, so that the engaging part 2*c* provided along the periphery of the end face of the DC motor 2 is brought into contact with the end face of the packing 11 fitted on the internal gear 5*a*, thus pushing the packing forwardly (to the right in FIG. 2). As a result, the packing 11 is deformed as shown in FIG. 3, being compressed against the flange 5*b* of the internal gear 5*a*. As a result of the deformation, the protrusions 13 of the packing 11 is inscribed in the front frame 7, while the inner cylindrical walls of the holes 14 formed in the protrusions 12 are brought into close contact with the penetrating bolts 8, and the front end faces of the protrusions 13 are pushed against the flange 5*b* of the internal gear 5*a*, thus closing the cuts 5*c* which are formed in the flange 5*b* to receive the penetrating bolts 8. As a result, the parts of the outer periphery of the internal gear over which the penetrating bolts 8 are extended are completely sealed, thus positively blocking the water which otherwise may flow down the penetrating bolts 8 into the DC motor from the starter frame 7. This will greatly improve the durability or service life of the DC motor 2.

Effects of the Invention

As was described above, in the starter with the planet gear speed reducer according to the invention, the cylindrical packing of elastic material is fitted on the internal gear, and the penetrating bolts are inserted into the holes of the protrusions which are extended outwardly from the cylindrical wall of the packing, and are tightened so that the packing is axially compressed against the engaging part of the motor which is engaged with the front frame. Therefore, the starter is completely free from the difficulty that water flows down the penetrating bolts into the motor from the frame, and accordingly the failures attributing to the entrance of water into the motor.

What is claimed is:

1. A starter with a planet gear speed reducer in which a front frame thereof is fixedly secured to a periphery of a end face of an electric motor with penetrating bolts which penetrate said electric motor, which comprises:

a cylindrical packing of elastic material arranged adjacent to an end face of said electric motor and fitted on an outer cylindrical wall of an internal gear;

wherein said cylindrical packing has protrusions which are radially outwardly extended from a cylindrical wall of said packing and have holes into which said penetrating bolts are inserted;

said end face of said electric motor has an engaging part which, when said front frame is fixedly secured to said end face of said electric motor with said penetrating bolts, is engaged with said front frame so that said protrusions of said cylindrical packing are inscribed in said front frame and a inner cylindrical walls of said holes formed in said protrusions are brought into close contact with said penetrating bolts; and said packing is compressed by said end face of said motor and a flange which is radially outwardly extended from a front edge of said outer cylindrical wall of said internal gear.

* * * * *